Feb. 20, 1940.   H. J. DE N. McCOLLUM   2,191,174
AUTOMOBILE HEATER
Filed Jan. 14, 1937   3 Sheets-Sheet 3
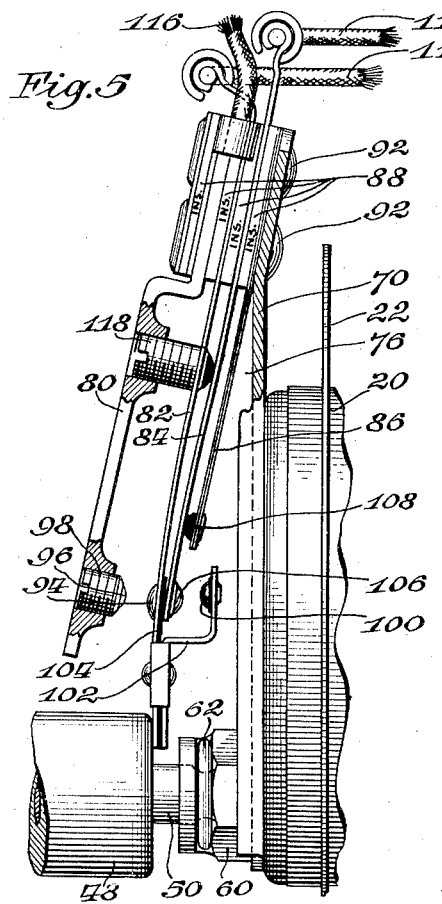
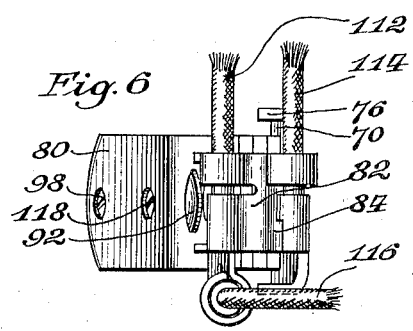
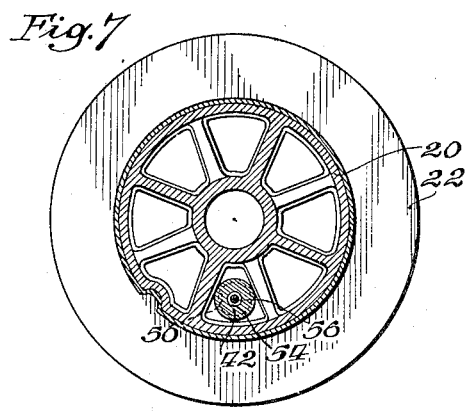
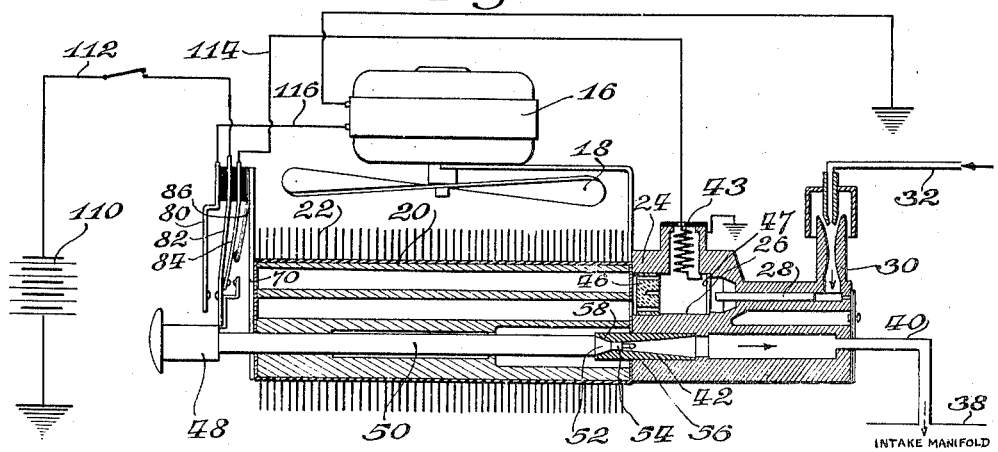
Inventor:
Henry J. DeN. McCollum
By Williams, Bradbury, McCaleb & Hinkle
Attys.

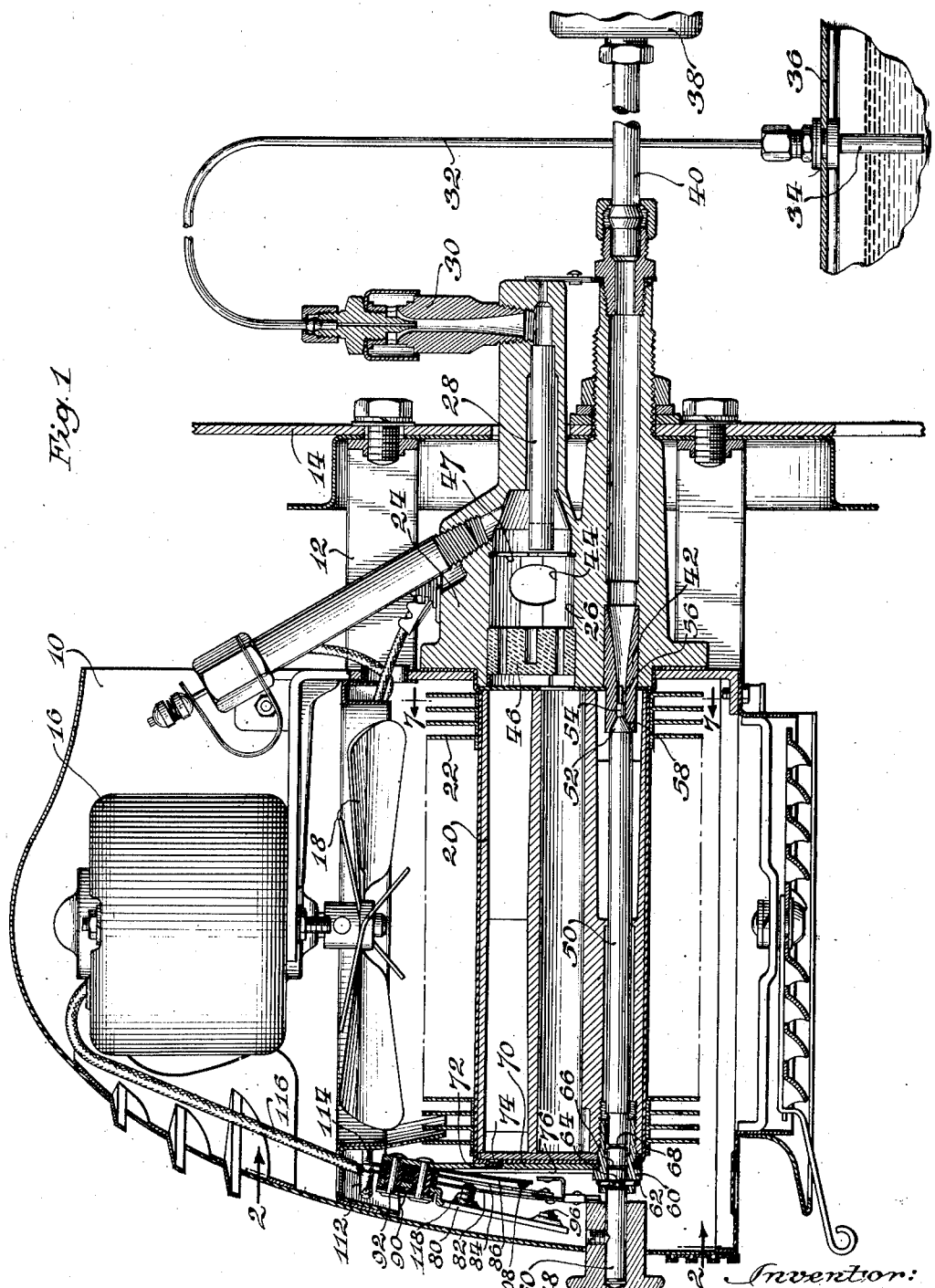

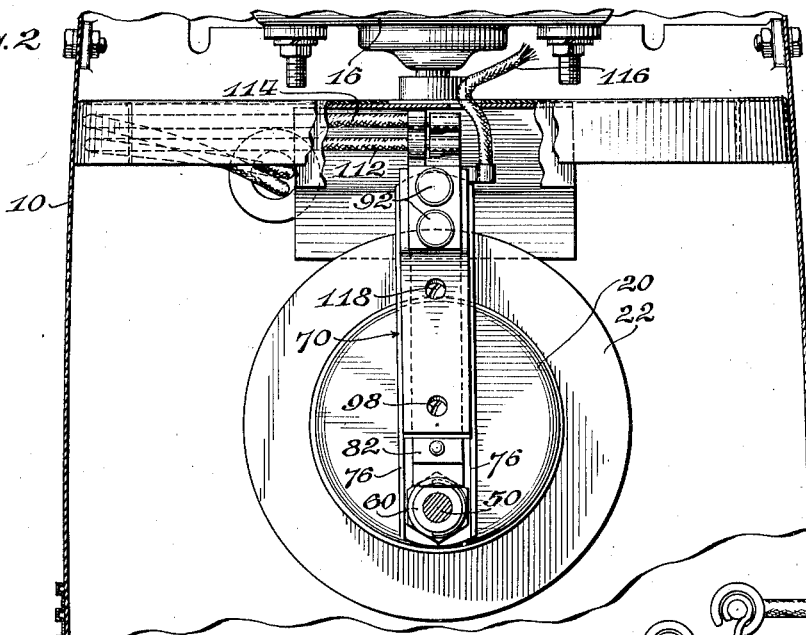
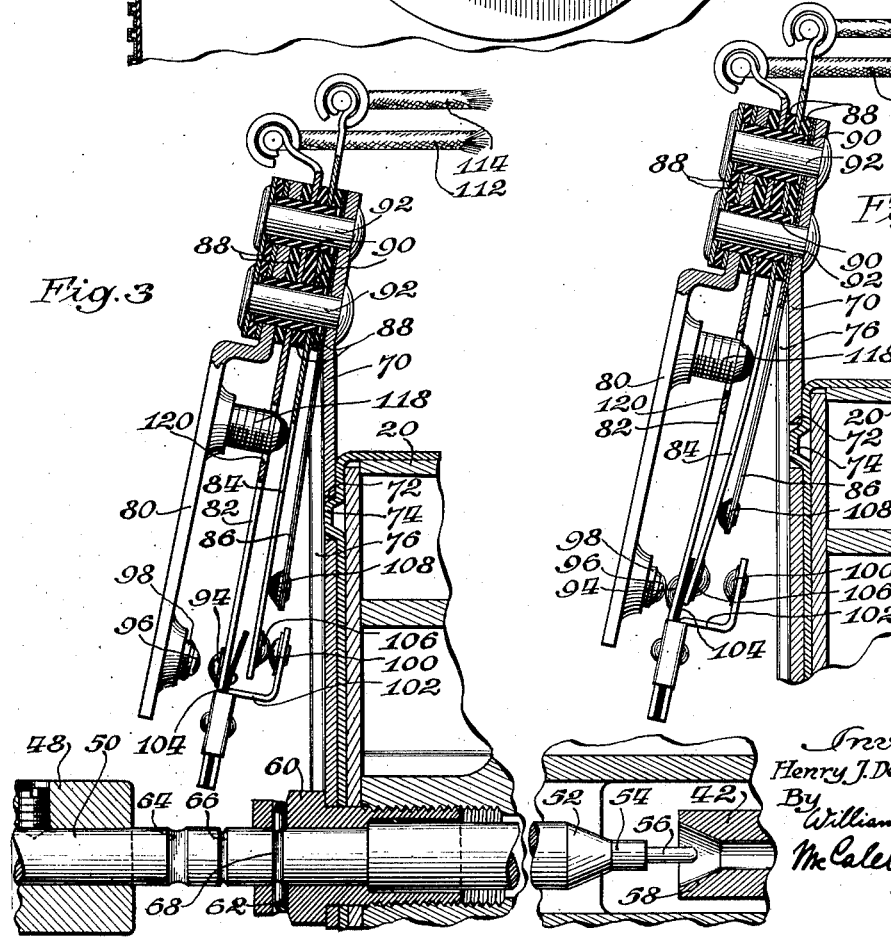

Patented Feb. 20, 1940

2,191,174

UNITED STATES PATENT OFFICE 2,191,174

AUTOMOBILE HEATER

Henry J. De N. McCollum, Evanston, Ill.

Application January 14, 1937, Serial No. 120,523

28 Claims. (Cl. 237—12.3)

My invention relates generally to heaters for automotive vehicles, and more particularly to improved means for controlling the operation of such heaters.

In my co-pending application, Serial No. 61,213, filed January 28, 1936, I have disclosed an automobile heater of the internal combustion type, in which the draft for combustion is maintained by drawing the products of combustion from the heater into the intake manifold of the engine of the automotive vehicle upon which the heater is mounted. The present invention includes various improvements on the heater disclosed in my aforesaid application, these improvements relating particularly to the means for starting and stopping operation of the heater and for controlling the supply of current to the fan motor and to the igniter.

It is an object of my invention to provide an improved mechanism to control the operation of an automobile heater, in which the fan motor is not operated until the radiator of the heater has become hot.

A further object is to provide an improved thermostatically controlled switch means for opening the circuit to the electrical igniter after the heater is operating normally.

A further object is to provide an improved manually operated control mechanism for an automobile heater.

A further object is to provide an improved control means for automobile heaters of the internal combustion type which will operate effectively under various adverse conditions of use and which will be efficient in consumption of electric current and which will require the minimum amount of attention of the operator of the vehicle.

Other objects will appear from the following description, reference being had to the accompanying drawings, in which:

Fig. 1 is a central vertical cross sectional view of the heater installed in an automotive vehicle;

Fig. 2 is a sectional view taken on the line 2—2 of Fig. 1;

Fig. 3 is a fragmentary sectional view of the control valve and control switch showing the parts in the position taken just after the control valve has been opened and before the radiator of the heater has attained its normal operating temperature;

Fig. 4 is a fragmentary sectional view of the control switch showing the parts in normal operating position;

Fig. 5 is a side elevational view (with parts shown in cross section) illustrating the switch parts in the positions taken when the heater is not in operation;

Fig. 6 is a plan view of the switch shown in Fig. 5;

Fig. 7 is a fragmentary vertical sectional view of the radiator taken on the line 7—7 of Fig. 1; and Fig. 8 is a wiring diagram of the control circuits.

As more fully disclosed in my aforesaid co-pending application, the heater of my invention comprises generally a casing 10 secured by suitable brackets 12 to the dashboard 14 of an automotive vehicle within the passenger compartment thereof. Within the casing 10 is mounted a suitable motor 16 for driving a fan 18. The latter circulates air past a radiator 20 which is surrounded by suitable heat radiating fins 22.

A combustion chamber casting 24 is secured to the radiator 20 and has a combustion chamber 26 formed therein. A combustible mixture of gasoline (or similar fuel) and air is supplied to the combustion chamber 26 through a pre-heating tube 28 from a carburetor 30. Gasoline for the carburetor 30 is supplied through a tube 32 which leads to a suitable intake fitting 34, which extends below the level of the gasoline contained in the float bowl 36 of the carburetor of the internal combustion engine forming part of the vehicle in which the heater is mounted. The products of combustion are drawn through suitable tortuous passageways in the radiator 20 by the vacuum of the intake manifold 38 of the internal combustion engine, the outlet of the tortuous passageway of the radiator being suitably connected to the intake manifold by a tube 40. The products of combustion are drawn through a Venturi-shaped compensator 42 for variations in the degrees of vacuum in the intake manifold.

The combustible mixture fed to the combustion chamber is ignited by suitable means, such as a coil 43 (Fig. 8) of high resistance wire which may be electrically heated to incandescence. This igniter is preferably located at the side of the combustion chamber 26 and is in communication therewith through an aperture 44 formed in the side of the chamber 26. An apertured plug 46 of a suitable refractory, ceramic material forms one wall of the combustion chamber 26, and, due to its low heat conductivity will, during normal operation, be maintained at a sufficiently high temperature to reignite the mixture of fuel and air should the flame accidental become extinguished. A baffle 47 is provided in the combustion chamber 26 to aid in intimately mixing the incoming fuel and air.

The operation of the heater is controlled by the button handle 48 which is secured to a stem 50. The stem 50 has a conical valve 52 and reduced diameter cylindrical portions 54 and 56 formed at its inner end. The valve portion 52 is adapted to engage and close the flaring mouth 58 of the compensator 42 when the button handle 48 is pushed to its innermost position, is shown in Fig. 1. When in this position, the stem 50 is slidably mounted in a bushing 60 which is threaded in the radiator casting 20. A C spring 62 is supported in the bushing 60 and has a portion adapted to engage in one of the three grooves 64, 66, and 68 to hold the valve stem in one of the three positions to which it may have been moved. In the position shown in Fig. 1, the spring will engage in the large groove 64 and hold the valve 52 against its seat formed by the flaring mouth 58 of the compensator 42. When the stem 50 has been pulled outwardly a sufficient distance to permit the C spring to engage in the annular groove 66, the valve 52 will be unseated, but the cylindrical portion 56 will still be positioned partially within the reduced diameter or throat portion of the compensator 42 so that the flow of gases of combustion through the compensator will be restricted thereby. When the stem 50 is pulled out further so as to permit engagement of the C spring 62 with the annular groove 68, the cylindrical portions 54 and 56 of the valve stem will have been substantially wholly removed from the mouth of the compensator 42 so that the flow of gases of combustion through the compensator will be unrestricted and the heater may operate at full capacity. Thus, the rate of production of heat may readily be controlled to suit the desires of the occupants of the vehicle. The cylindrical projections 54, 56 also serve to loosen any carbon which may have been deposited in the throat of the compensator 42.

Means are provided to control the supply of current to the igniter and to the electric fan incidental to the movement of the handle 48 from closed to full or partially open position. This means includes a multiple switch comprising a mounting plate 70, the lower end of which is apertured to receive the bushing 60 by which the mounting plate is rigidly secured to the radiator 20. This mounting plate has a hole 72 formed therein for engagement with a projection 74 formed on the end of the housing of the radiator 20. The mounting plate is thus prevented from rotating about the bushing 60 by the projection 74. To assure a greater rigidity, the mounting plate 70 has a pair of longitudinally extending flanges 76.

The upper end of the switch mounting plate 70 is bent at a slight angle to the remaining portion of the plate and has secured thereto a rigid contact arm 80, flexible contact arms 82 and 84, and a bimetal thermostatic element 86. The arms 80, 82, and 84 are insulated from each other and from the mounting plate 70 by blocks of insulation 88 and bushings 90 (Fig. 3), which latter surround rivets 92 by which all of these arms are rigidly secured to the mounting plate 70. The contact arm 82 has a contact point 94 riveted thereto for engagement with a contact 96 formed at the end of an adjustable screw 98 threaded in the rigid arm 80. The contact arm 82 carries a second contact point 100 mounted upon an off-set arm 102 which is riveted to the end of arm 82. A strip 104 of insulating material is likewise secured to the arm 82 by the rivet which secures the arm 102 to the contact arm 82. The arm 84 carries a contact point 106 adapted to cooperate with the contact point 100. The bimetal thermostatic arm 86 is not insulated from the supporting plate 70 and is not intended to carry current, but is provided merely as a mechanical actuator for the remaining contact arms, and for this reason is provided with a button 108 of insulating material.

The lower end of the arm 82 lies in the path of the control knob 48, and, when the heater is not in operation, the control knob will hold the switch parts in the positions in which they are shown in Fig. 5. When the control knob is pulled outwardly to initiate operation of the heater, the contact arm 82 will, due to its resiliency, resume a rectilinear position, as shown in Fig. 3, whereupon contact 100 will engage contact 106, while contacts 94, 96 will remain separated.

The contact arm 82 is suitably connected to the battery 110, which forms the usual equipment of the automotive vehicle, this connection being effected by a conductor 112 secured to the upper end of the contact arm 82. Contact arm 84 is connected by conductor 114 to igniter 43. Thus, upon closure of the contacts 100, 106, current will flow from the battery through contact arm 82, contacts 100, 106, contact arm 84, conductor 114, to one end of the high resistance heating coil igniter 43, the other end of which is grounded.

After the heater has commenced operation and the radiator 20 raised to its normal operating temperature, the bimetal thermostatic element 86 will flex from the position in which it is shown in Fig. 3 toward the position in which it is shown in Fig. 4. During the initial portion of this flexing movement of the thermostatic element 86, the contacts 94, 96 will close, since the contact arm 82 is biased normally to move to close these contacts, and current will thus be supplied to the fan motor 16. Shortly thereafter, the circuit to the igniter 43 will be broken, since the thermostatic element, in its further flexing movement, will move contact point 106 from engagement with contact point 100. The rigid contact arm 80 is connected to a terminal of the fan motor 16 by a conductor 116 so that when the radiator has reached its normal operating temperature the fan motor will be connected to the battery and cause circulation of air from the passenger compartment of the vehicle past the radiator. By thus delaying the closing of the circuit to the fan motor until the radiator has attained its normal operating temperature, the blowing of a blast of cold air incidental to commencement of normal operation of the heater is prevented. Thus, very shortly after the heater commences operating, the supply of current to the igniter will be discontinued, thus conserving the energy of the battery 110. If, however, the flame should accidentally become extinguished, the igniter circuit contacts 100, 106 may close without opening the fan motor circuit.

The temperature at which the igniter circuit will be opened may be varied by adjustment of a screw 118 which is threaded in the fixed contact arm 80 and which projects freely through an opening 120 formed in the contact arm 82 and the insulating tip of which engages the contact arm 84. By turning the set screw 118 inwardly, the force required to flex the contact arm 84 may be increased, and thus the closing of the circuit to the fan motor and the opening of the circuit to the igniter may be delayed until the radiator has attained a higher temperature. Conversely, by turning the set screw 118 outwardly, the force required to open the igniter circuit may be lessened, and hence the closing of the circuit to the fan motor and the opening of the igniter circuit may be obtained when the radiator 20 is at a lower temperature. Similarly, the temperature at which the fan motor circuit will be completed may further be varied by adjustment of the screw 98 which carries contact 96.

To start the heater in operation, the control knob 48 is pulled outwardly, thus opening the valve 52 formed on the stem 50. Assuming the engine to be in operation, the vacuum of the intake manifold will thereupon draw gasoline from the float bowl 36 of the engine carburetor, through the tube 32, into the carburetor 30, where the gasoline will be mixed with air, pass through the preheating tube 28 into the combustion chamber 26. When the knob 48 is pulled outwardly, the contact arm 82 will, due to its resiliency, move to a position to close the contacts 100, 106, thereby supplying current to the igniter 43. The igniter will rapidly be heated to the temperature of incandescence and ignite the combustible mixture of gasoline and air passing through the combustion chamber 26. The heated products of combustion will thereafter pass through the tortuous passageway formed in the radiator 20 and from thence through the compensator 42 and tube 40 to the intake manifold of the engine. Since the exhaust of the heater is directly into the intake manifold of the engine, no serious consequences will follow failure of the igniter immediately to ignite the mixture in the combustion chamber.

After the heater has been in operation a sufficient length of time to raise the temperature of the radiator to its normal operating temperature, the heat conducted from the radiator to the thermostatic element 86 will cause the latter to swing toward the contact arm 84 and to engage the latter, and by relieving the resilient force of the arm 84 upon the arm 82, permit the contacts 94, 96 to close. Continued flexure of the thermostatic element will thereafter separate the contact points 100, 106, thereby cutting off the supply of current to the igniter. Further heating of the thermostatic element may cause it to press the contact arm 84 against the insulating strip 104 which acts as a stop, as shown in Fig. 4. Closure of these contacts 94, 96 results in supplying current to the fan motor 16, which will circulate the air in the passenger compartment of the vehicle past the radiator in the usual manner.

The heater will thus continue in operation until the control knob 48 is pushed inwardly. Full inward movement of the control knob will result in closure of the valve 52, thus immediately stopping the flow of gasoline and air into the combustion chamber, and at the same time the knob 48 will engage the end of contact arm 82 and swing the latter to break the contacts 94, 96 and the contacts 100, 106. Partial inward movement of the control knob will result in partially blocking the passageway through the compensator 42 by means of projection 56 and thereby decreasing the rate of heat generation, but will not alter the positions of the switch contacts.

While I have shown and described a preferred embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. In an automobile heater of the internal combustion type, the combination of a combustion chamber, means for supplying a mixture of fuel and air to said combustion chamber, means for igniting said mixture in said combustion chamber, a radiator connected to receive products of combustion from said combustion chamber, a fan for circulating air past said radiator, a motor for driving said fan, means for causing flow of the products of combustion through said radiator, a valve in the path of flow of the products of combustion, a manually engageable member for operating said valve, a switch for controlling flow of current to said igniting means, a switch for controlling flow of current to said fan motor, a thermostatic element, means operable by said manually operable member to close said igniting means switch when moved to valve opening position, and means operated by said thermostatic element when said radiator has attained normal operating temperature to open said igniting means switch and close said fan motor switch.

2. In an automobile heater of the internal combustion type, the combination of a combustion chamber, means for supplying a mixture of fuel and air to said combustion chamber, an igniter for igniting said mixture in said combustion chamber, a radiator connected to receive products of combustion from said combustion chamber, a fan for circulating air past said radiator, a motor driving said fan, means for causing flow of the products of combustion through said radiator, a manually operable control member, a switch for controlling flow of current to said igniter, a switch for controlling flow of current to said fan motor, a thermostatic element, means operable by said control member to close said igniter switch, and means operable by said thermostatic element when said radiator has attained normal operating temperature to open said igniter switch and close said fan motor switch.

3. In an automobile heater of the internal combustion type, the combination of a valve for controlling the flow of gases of combustion through the heater, a manually operable member for actuating said valve, an igniter switch, a fan motor switch, a thermostatic element in position to be heated when the heater is in operation, means operated by said manually operated member to close said igniter switch when said valve is moved to open position, and means operable by said thermostatic element to open said igniter switch and close said fan motor switch when said heater has attained a predetermined temperature.

4. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means for controlling the operation of the heater comprising, a control handle, a valve operated by said handle for controlling the flow of gas through said radiator, a switch for connecting said igniter to said source, a switch for connecting said fan motor to said source, said control handle being operable to close said igniter switch when the handle is moved to position to open said valve, and a thermostatic element in heat conducting relationship with said radiator and operable when said radiator has attained a predetermined temperature to open said igniter switch and close said fan motor switch.

5. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means for controlling the operation of the heater comprising, a control handle, a valve operated by said handle for controlling the flow of gas through said radiator, a switch for connecting said igniter to said source, a switch for connecting said fan motor to said source, said control handle being operable to close said igniter switch when the handle is moved to position to open said valve, a thermostatic element in heat conducting relationship with said radiator and operable when said radiator has attained a predetermined temperature to open said igniter switch and close said fan motor switch, and means to adjust said switches for operation by said thermostat at different temperatures.

6. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means to control the operation of the heater comprising, a handle, a valve operated by said handle to control the flow of gases through said radiator, a movable contact member connected to said source, a second movable contact member connected to said igniter, a fixed contact connected to said fan motor, means to move said source contact member into contact with said igniter contact member upon movement of said handle to valve opening position, and thermostatically operated means responsive to the temperature of said radiator and operative upon a predetermined radiator temperature to separate said source contact member from said igniter contact member and move it into contact with said fan motor contact member.

7. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means to control the operation of the heater comprising, a handle, a valve operated by said handle to control the flow of gases through said radiator, a movable contact member connected to said source, a second movable contact member connected to said igniter, a fixed contact connected to said fan motor, means to move said source contact member into contact with said igniter contact member upon movement of said handle to valve opening position, and automatically operable means to separate said source contact member from said igniter contact member and to connect said source contact to said fixed contact after the heater is operating normally.

8. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means to control the operation of the heater comprising, a control handle, a valve operated by said handle to control the flow of gases through said radiator, a movable contact member connected to said source, a second movable contact member connected to said igniter, a fixed contact connected to said fan motor, means to move said source contact member into contact with said igniter contact member upon movement of said handle to valve opening position, and automatically operable means for moving said source contact into engagement with said fan motor contact after normal operation of the heater has been attained.

9. An automobile heater of the internal combustion type comprising, a combustion chamber, means for supplying a mixture of fuel and air to said chamber, an electrical igniter for igniting the mixture in said chamber, a radiator connected to said chamber, means to draw the products of combustion from said chamber through said radiator, a fan for circulating air from the passenger compartment of the automobile past said radiator, a motor for driving said fan, a source of electrical energy, and means to control the operation of the heater comprising, a handle, a valve operated by said handle to control the flow of gases through said radiator, a movable contact member connected to said source, a second movable contact member connected to said igniter, a fixed contact connected to said fan motor, means to move said source contact member into contact with said igniter contact member upon movement of said handle to valve opening position, and automatically operable means for sequentially moving said source contact into engagement with said fan motor contact and from engagement with said igniter contact when said radiator attains a predetermined temperature.

10. In an automobile heater, the combination of a combustion chamber, means to supply fuel thereto, a radiator having a passageway connected to said combustion chamber to receive the products of combustion therefrom, suction means to draw the products of combustion through said radiator, a Venturi-shaped restriction element at the outlet of said radiator for compensating for variations in the degree of vacuum of said suction creating means, a valve cooperable with said element for controlling the flow of gases of combustion therethrough, and a projection on said valve extending into the mouth of said element when said valve is moved a short distance from contact with said element thereby to restrict the flow of gases through said element.

11. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, a manually movable element for simultaneously opening said valve and connecting said source with said igniter, and a thermostatic element operable, when said radiator attains a predetermined temperature, to disconnect said igniter from said source and to connect said fan motor thereto.

12. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, a switch to connect said current source to said igniter, a switch to connect said current source to said fan motor, a manually operable control element, an operating connection between said control element and said valve, means movable with said control element to hold said igniter switch open when said control element is in valve closing position, resilient means to close said igniter switch when said control element is moved to valve opening position, and heat responsive means positioned to receive heat from said radiator and operable to open said igniter switch and to close said fan motor switch when heated to a predetermined temperature.

13. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, switches to connect said source to said igniter and fan motor respectively, and a manually actuated control element operable upon movement in one direction to open said switches and close said valve.

14. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, switches to connect said source with said fan motor and ignited respectively, a manually actuated control element for operating said valve and controlling the operation of said switches, and means responsive to heat received from said radiator and operable at a predetermined temperature to open said igniter switch when said control element is in valve opening position.

15. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, switches to connect said source with said fan motor and igniter respectively, a manually actuated control element for operating said valve and controlling the operation of said switches, and means responsive to heat received from said radiator and operable at a predetermined temperature to close said fan motor switch when said control element is in valve opening position, and at a predetermined higher temperature to open said igniter switch.

16. In an internal combustion type heater, the combination of a combustion chamber, means to supply a combustible mixture of liquid fuel and air to said combustion chamber, a radiator connected to said combustion chamber to receive the hot gases of combustion therefrom, means to connect the outlet of the radiator to the intake manifold of the automobile engine, an electric igniter for igniting the fuel in said combustion chamber, a fan for circulating air past said radiator, a motor for driving said fan, a valve for controlling the flow of gases through said combustion chamber, a source of current for said motor and for said igniter, manually operable means to open and close said valve, and means rendered operative upon opening said valve successively to connect said igniter to said source, to connect said fan motor to said source, and to disconnect said igniter from said source.

17. In an automobile heater of the internal combustion type, the combination of a combustion chamber, means for supplying a mixture of fuel and air to said combustion chamber, means for igniting said mixture in said combustion chamber, a radiator connected to receive products of combustion from said combustion chamber, a fan for circulating air past said radiator, a motor for driving said fan, means for causing flow of the products of combustion through said radiator, a manually operable member, a switch for controlling flow of current to said igniting means, a switch for controlling flow of current to said fan motor, a thermostatic element, means operable by said manually operable member to close said igniting means switch, and means operated by said thermostatic element when said radiator has attained substantially normal operating temperature to open said igniting means switch and, when said radiator has reached its normal operating temperature, to close said fan motor switch.

18. In an automobile heater of the internal combustion type, the combination of a combustion chamber, means for supplying a mixture of fuel and air to said combustion chamber, an igniter for igniting said mixture in said combustion chamber, a radiator connected to receive products of combustion from said combustion chamber, means for causing flow of the products of combustion through said radiator, a manually operable control member movable between "On" and "Off" positions, a spring-closed switch for controlling flow of current to said igniter, said switch being held open by said control member when the latter is in "Off" position, a switch for controlling flow of current to said fan motor, temperature responsive means, means operable by said control member to close said igniter switch, and means operable by said temperature responsive means successively to open said igniter switch and close said fan motor switch as said radiator attains its normal operating temperature.

19. In an automobile heater of the internal combustion type, the combination of a valve for controlling the flow of gases of combustion through the heater, a manually operable member for actuating said valve, an igniter switch, a fan motor switch, temperature responsive means in position to be heated when the heater is in operation, means controlled by said manually operable member to close said igniter switch when said valve is moved to open position, and means operable by said temperature responsive means sequentially to open said igniter switch and close said fan motor switch as said heater attains substantially normal operating temperature.

20. In an automobile heater, the combination of a combustion chamber, means to supply fuel thereto, a radiator having a passageway connected to said combustion chamber to receive the products of combustion therefrom, suction means to draw the products of combustion through said radiator, and means to control the flow of the products of combustion through said radiator, said means comprising a valve seat having an orifice extending therethrough, said valve seat being located adjacent the outlet end of said passageway through said radiator, a valve engageable with said seat, said valve being reciprocable toward and away from said seat by translatory movement, and flow control means on said valve projecting into said orifice when said valve is closed, said flow control means having a portion of diameter slightly less than that of said orifice, thereby to clear said orifice of foreign particles whenever said valve is moved to closed position; and manually operable means selectively to move said valve and flow control means from closed position to a position in which said valve is open and said flow control means restricts the flow through said orifice or to a position in which neither said valve nor said flow control means restricts the flow through said orifice.

21. In an automobile heater, the combination of a combustion chamber, means to supply fuel thereto, a radiator having a passageway connected to said combustion chamber to receive the products of combustion therefrom, suction means to draw the products of combustion through said radiator; and means to control the flow of the products of combustion through said radiator, said means comprising a valve seat located adjacent the outlet end of said passageway through said radiator and having an orifice therethrough, a three position translatory valve cooperable with said seat, said valve having a protruding portion of sufficiently small diameter to enter the orifice in said valve seat and to clear said orifice of foreign particles which would otherwise obstruct the flow of the products of combustion therethrough, said projection being substantially removed from said orifice when said valve is in open position, detent means to hold said valve in any one of its three positions, manually operable means for actuating said valve, and means associated with said valve for restricting but not stopping flow through said radiator when said valve is moved to one of its three positions.

22. In an automobile heater of the internal combustion type, the combination of a combustion chamber, electrical igniting means associated with said chamber, a radiator heated by the products of combustion, means to promote a flow of fuel and air through said combustion chamber and radiator below atmospheric pressure, means for circulating air past said radiator to be heated thereby, said means including an electric motor, a manually operable control element for controlling the flow of the products of combustion through said radiator, two pairs of switch contacts, one pair being in series with said electrical igniter and the other pair being in series with said electric motor, means operated by said manual control element to close the pair of switch contacts in series with said igniter, and temperature responsive means receiving heat from said radiator to close said electric motor contacts and to separate said igniter contacts when the temperature of said radiator exceeds a predetermined maximum value.

23. In an automobile heater of the internal combustion type having valve means to control the flow of gases of combustion through the heater and having a manually operable member for actuating said valve, the combination of an igniter switch, a fan motor switch, a thermostatic element in position to be heated when the heater is in operation, means moved incidental to the movement of the manually operable member to valve-opening position to close said igniter switch, and means operated by said thermostatic element to open said igniter switch and to close said fan motor switch as said thermostatic element passes through a predetermined range of temperature.

24. In an automotive vehicle having a passenger compartment, an internal combustion engine having an intake manifold in which a partial vacuum exists while the engine is running and a liquid fuel supply for said engine, an internal combustion heater for said passenger compartment, said heater comprising a heat radiator having a passageway extending therethrough, means for circulating air over said radiator, a connection from one end of said passageway to said intake manifold, a combustion chamber connected to the other end of said passageway, a fuel supply, a carburetor for mixing air with said fuel and supplying the mixture to said combustion chamber, electrical means in said combustion chamber for igniting said mixture, a valve in said connection, a switch for controlling the supply of current to said igniter, and a manually actuated element to operate both said switch and said valve.

25. In a switch device, the combination of a manual control element, a pair of complementary switch contacts resiliently closable upon movement of said manual control element to operative position, a bimetal temperature responsive element operable to complete an electrical circuit when heated to a predetermined temperature and constructed and arranged to separate said pair of contacts when it is heated to a predetermined higher temperature.

26. In an automobile heater of the internal combustion type in which a combustible mixture of fuel and air is supplied to a combustion chamber and the products of combustion drawn through a heat exchange device and delivered to the intake manifold of the automobile engine under the influence of the suction therein, the combination of an electrical igniter for igniting the combustible mixture in the combustion chamber, a source of electrical energy, a switch connecting said source to said electrical igniter, a valve for controlling the flow through said combustion chamber, heat exchanger, and to said intake manifold, a manually operable element for moving said valve, said element and valve having at least three positions of adjustment, including a closed position, a full open position, and an intermediate position, said manually operable element and said switch being so operatively associated and so located and arranged that said switch will be operated by said manually operable element when the latter is moved from its intermediate to its closed position but will not be operated when said manually operable element is moved from its full open position to its intermediate position.

27. In an automobile heater of the internal combustion type in which a combustible mixture of fuel and air is supplied to a combustion chamber and the products of combustion drawn through a heat exchange device, and in which electrical energy is required for the operation of a part of the heater, the combination of an electrical circuit for supplying electrical energy to said part, a switch in said circuit, a valve for controlling the flow through said combustion chamber and heat exchanger, a manually operable element for moving said valve, said element and valve having at least three positions of adjustment, including a closed position, a full open position, and an intermediate position, and means actuated by said control element to operate said switch, said means being so arranged with respect to said control element and said switch that upon movement of said control element from full open position to closed position, said switch will be operated thereby only after said control element has passed through said intermediate position.

28. In an automobile heater of the internal combustion type in which a combustible mixture of fuel and air is supplied to a combustion chamber and the products of combustion drawn through a heat exchange device, and in which electrical energy is required for the operation of a part of the heater, the combination of an electrical circuit for supplying electrical energy to said part, a switch n said circuit, a valve for controlling the flow through said combustion chamber and heat exchanger, a manually operable element for moving said valve, said element and valve having at least three positions of adjustment, including a closed position, a full open position, and an intermediate position, and means actuated by said control element to operate said switch, said means being so arranged with respect to said control element and said switch that upon movement of said control element from closed to open position said switch will be operated only during that portion of the movement taking place between the closed and intermediate positions.

HENRY J. DE N. McCOLLUM.